United States Patent [19]

Grabis et al.

[11] Patent Number: 4,918,535
[45] Date of Patent: Apr. 17, 1990

[54] TELEVISION PROJECTION SYSTEM

[75] Inventors: Dietrich Grabis, St. Rafael, Calif.; Peter Knoll, Ettlingen, Fed. Rep. of Germany

[73] Assignee: Robert Bosch GmbH, Stuttgart, Fed. Rep. of Germany

[21] Appl. No.: 262,539

[22] Filed: Oct. 25, 1988

[51] Int. Cl.⁴ ............................................. H04N 5/74
[52] U.S. Cl. .................................. 358/237; 358/231; 358/253; 358/60
[58] Field of Search ............. 358/231, 237, 238, 250, 358/253, 254, 60, 61, 62; 353/77, 38, 101

[56] References Cited

U.S. PATENT DOCUMENTS

| 4,177,484 | 12/1979 | Boje | 358/254 |
|---|---|---|---|
| 4,209,807 | 1/1980 | Arita | 358/237 |
| 4,400,723 | 8/1983 | Fanizza et al. | 358/60 |
| 4,439,027 | 3/1984 | Shioda et al. | 358/237 X |
| 4,491,872 | 1/1985 | Boldt et al. | 358/237 |
| 4,515,442 | 5/1985 | Aron | 358/61 |
| 4,578,710 | 3/1986 | Hasegawa et al. | 358/237 X |
| 4,621,293 | 11/1986 | Matis | 358/231 |
| 4,679,069 | 7/1987 | Andrsa et al. | 358/60 |

FOREIGN PATENT DOCUMENTS 63-64483 3/1988 Japan .
63-105584 5/1988 Japan .
63-197180 8/1988 Japan .

*Primary Examiner*—Howard W. Britton
*Assistant Examiner*—Mark R. Powell
*Attorney, Agent, or Firm*—Frishauf, Holtz, Goodman & Woodward

[57] ABSTRACT

A TV display, typically derived from a high-intensity miniature cathode ray tube (1) and available on a projection screen (8) thereof is enlarged by an optical lens system and, as enlarged, projected behind a viewing screen (10) via an optical folded system. The specific arrangement of the TV tube (1) and one or more deflection mirrors (3, 4, 5) forming the optical folded system towards the viewing screen (10) permit flat and lightweight construction of the projection system.

5 Claims, 2 Drawing Sheets

TELEVISION PROJECTION SYSTEM

Reference to related publication

German Patent Disclosure Document DE-OS 28 53 831, corresponding to U.S. Pat. No. 4,209,807, ARITA.

The present invention relates to a television viewing system, and more particularly to viewing television displays on large-size television screens, in combination with television apparatus which can be built in a compact manner.

BACKGROUND

Television apparatus having large viewing screens have to include a housings of substantial depth, which is particularly annoying if the television tubes are large. Additionally, the weight of such apparatus with large tubes becomes substantial, since the weight of the tube increases rapidly with its size.

It has been proposed to reduce the depth of television apparatus by use of cathode ray tubes in which the beams providing the television (TV) display are deflected. The TV tubes are located laterally with respect to the imaging screen of the tube. The electron beam within the tube is accelerated and suitably controlled within the neck of the tube. The beam is then deflected by a suitably provided and negatively charged electrode, for deflection on the phosphorescent layer of the TV imaging screen. This solution does not substantially decrease the size of the apparatus, since the system to generate the beam still requires substantial space. The brightness of such arrangement is unsatisfactory. This system can be used only with relatively small screens since, if the size of the screen is increased, deflection cannot be obtained without distortion; the costs of such systems also escalate rapidly as the screen size increases.

It has also been proposed to place three cathode ray beam tubes next to each other which, in accordance with the base colors thereof, project separate part images over a tiltable deflection mirror to a projection screen located on the housing, the respective primary color images then being super-imposed on the screen (see U.S. Pat. No. 4,209,807, ARITA, and corresponding German Patent Disclosure Document DE-OS 28 53 831). This arrangement has not been found to be commercially suitable since, to provide the viewing image, the mirror and the viewing screen must be flipped into a viewing position and then the relative position of the mirror, viewing screen and TV tubes carefully adjusted. The apparatus, when open, is subject to dust and contamination, so that eventually disturbance spots and the like will occur on the viewing screen. The arrangement is large and, since it requires three TV tubes, expensive. For large-area projection, distortions and unsharp regions, similar to out-of-focus portions of the image, are practically unavoidable and arise particularly towards the edge of the screen. It is practically impossible to project the primary images from the three TV tubes in precise register over the entire projection surface.

The mirror system is open and exposed and, thus, light reflection on the mirror due to extraneous light and other light reflections result in decreased contrasts and annoying ghosts, which interfere with viewing of the TV display.

THE INVENTION

It is an object to provide a television projection system in which projection of a television display can be easily obtained, which does not require substantial depth for the apparatus and which, relative to known apparatus, is of reduced weight and complexity.

Briefly, an optical enlarging lens system is interposed on the optical part between the projection screen from a television tube and at least one mirror of a mirror system to direct the display from the projection screen of the tube towards a viewing screen. The mirror forms an optical folded system which images the TV display on the viewing screen. Preferably, the TV tube is a miniature cathode ray tube. The mirror system, preferably, includes more than one mirror which, then, provides for versatility of placing the TV tube with respect to the viewing screen. The arrangement can be located at random in space, that is, the TV projection tube can be placed laterally with respect to the viewing screen, or therebelow. For some installations, an essentially vertical path of the light beams is desirable.

In accordance with a feature of the invention, the TV tube, preferably the miniature cathode ray tube, is offset with respect to the central axis of the viewing screen, and the arrangement between the screen of the TV tube and of the viewing screen is so made that points within the field of view which are projected and have the same angle relative to a central focal axis always will have the same optical distance between the projection screen of the TV tube and the viewing screen.

The deflection mirror or mirrors may be of any suitable kind. In accordance with a preferred embodiment, however, the deflection mirrors have a non-metallic carrier or support and are so arranged that the incident light beam angle is at least slightly greater than the critical angle in which total absorption occurs.

The system has the advantage that the optical projection is simplified. By use of an optical lens systems, combined with a fold-type mirror system, or low depth of the projection TV system is ensured, while also permitting reduction in overall weight of the system. Alternatively the optical lens system may be eliminated; this is a function of the optical characteristics of the CRT (1).

The use of a miniature cathode ray tube is particularly preferred since such use permits reduction in size and weight of the overall system. Lateral offset of the TV tube with respect to the imaging screen—or, if vertically arranged, offset above or below the viewing screen—permits particularly space-saving construction of the optical fold system. The lens system in combination with the mirror provides for projection of the image on the viewing screen without distortion and out-of-focus or fuzzy regions, and eliminates additional focusing. The low depth or thin construction of the apparatus and system is additionally enhanced by so guiding the light beam that it will be within the limiting range of the critical angle, in which total absorption of the light is obtained. So constructing the system, and arranging the mirror or mirrors, permits a particularly thin and space-consuming apparatus or system.

In accordance with a feature of the invention, a Fresnel lens such as a cross lenticular type, an be used in advance of the viewing screen—with respect to the path of the light beam—to provide for additional distortion-free enlargement of the projected image.

The system is readily adapted to black-and-white (B/W) as well as color television. In dependence on the type of TV tube used, filters such as color filters, circular polarization filters or grey filters can be included on the path of the light beam and, preferably, in advance of the viewing screen, so that annoying interferences due to reflection glare, ghost images and the like, can be controlled or eliminated.

The optical folding system may utilize only a single mirror. When using only a single mirror, a particularly simple and easily constructed TV system can be obtained. Utilizing a single mirror or a plurality of mirrors, as desired, permits ready association of the TV display from the screen of the TV tube on the viewing screen, while leaving the designer of the system wide freedom in adapting it to available space or viewing areas.

DRAWINGS ILLUSTRATING EMBODIMENTS OF THE INVENTION

DETAILED DESCRIPTION

Figure 1A:
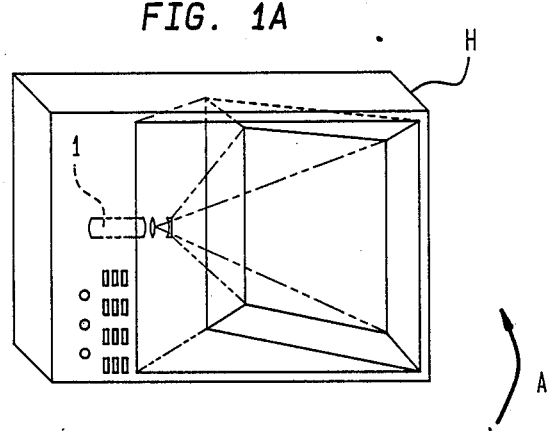
FIG. 1a is a perspective, part-phantom front view of a projection TV apparatus in accordance with the invention.

FIG. 1a shows a housing H which includes the customary control apparatus, shown only schematically, and not further described since they may be in accordance with any desired standard system. Shown in phantom representation within the housing H, and suitably retained therein, is a miniature cathode ray tube (CRT) 1 which generates a TV display on the tube screen thereof, see FIG. 1b. The housing H is formed with an opening at the front side in which a viewing screen 10 is secured. The viewing screen 10 is placed vertically and slightly inclined towards the back of the housing, as best seen in FIG. 1a. The TV display is projected from behind on the viewing screen.

In accordance with a feature of the invention, an enlarging optical lens system 2 is provided between the projection screen 8 of the CRT 1 and a first mirror 3 which is located behind the viewing screen 10. The first mirror 3 is so constructed that the image projected from the CRT 1 is displayed on the projection screen 10.

Operation

The display generated on the screen 8 of the CRT 1 is enlarged by the optical lens system 2 and projected on the first mirror 3. The first mirror 3, together with the viewing screen 10, form an optical folded system, in which the space requirements of the projection apparatus for projection is small. In accordance with a feature of the invention, a Fresnel lens 11 can be located behind or instead of the viewing screen 10 (see FIG. 1b). A crossed lenticular, single or dual element Fresnel lens preferably compression molded out of optically clear acrylic may be used to obtain additional distortion-free enlargement of the TV image.

Figure 1B:
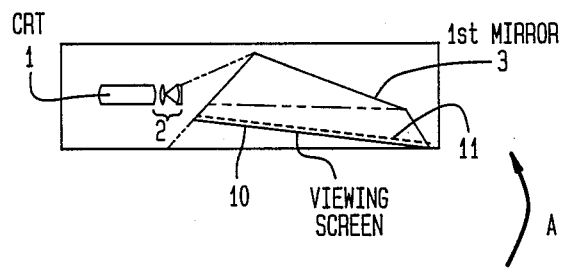
FIG. 1b is a phantom top view of the apparatus of FIG. 1a, highly schematic and illustrating the placement of a cathode ray tube (CRT) with respect to a mirror and a viewing screen.

The arrangement in FIG. 1a and FIG. 1b is shown in connection with the horizontally placed housing H. Of course, the system can be tipped by 90°, as shown schematically by the arrow A in FIGS. 1a and 1b, respectively, to provide an apparatus in which the space for the optical path of the display from screen 8 of the CRT 1, as well as the CRT 1 and associated signal and power processing equipment, can be located below the viewing screen 10.

Figure 2:
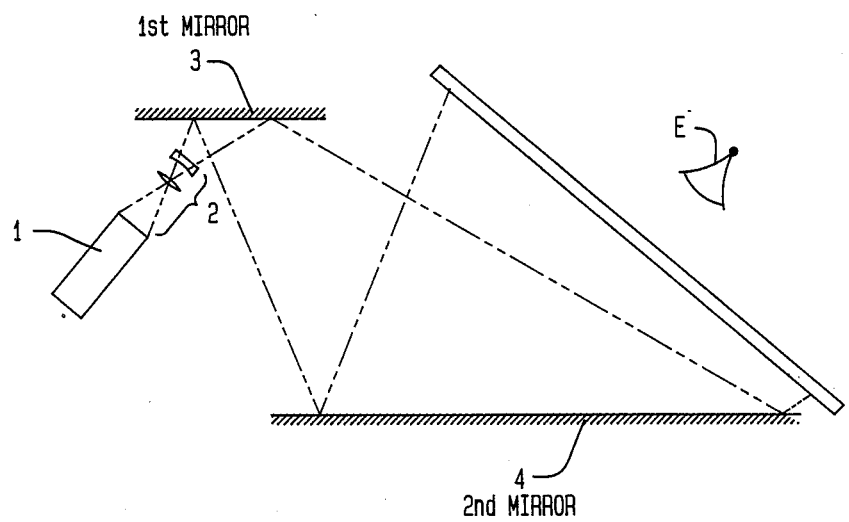
FIG. 2 is a schematic view illustrating an arrangement with a CRT and two mirrors.

FIG. 2 illustrates an embodiment in which the optical path is deflected by two mirrors 3 and 4. As seen in FIG. 2, the beam from the projection screen 8 of the CRT 1 is projected through the optical system 2 to a first mirror 3, from which the TV display is then projected to a second mirror 4 which is located approximately parallel to the mirror 3. The image on the first mirror 3 is enlarged by the optical lens system 2. The TV display is then projected from behind on the viewing screen 10. The position of the viewer, shown schematically by the eye symbol E is also shown in FIG. 2. This arrangement is quite compact, and may be more compact than that of FIG. 1, or provide for higher enlargement. In this projection, the image from the CRT 1 is inverted on the projection screen 10. Thus, if this system is used, the CRT 1 must be controlled for reverse projection, which is easily obtained electronically, or the CRT 1 must be rotated by 180°. So constructing the deflection system for the electron beam of the CRT 1 that the image appears reversed right-for-left or top-for-bottom can be easily obtained electronically by suitable signal processing within the deflection circuit.

Figure 3:
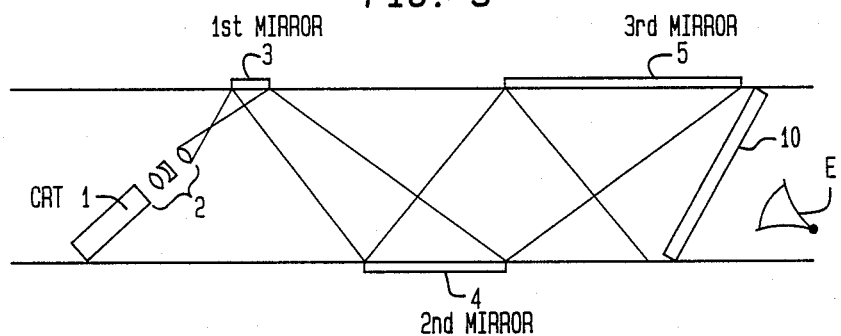
FIG. 3 is a schematic showing of the light path and system using three mirrors.

FIG. 3 illustrates an arrangement in which three deflection mirrors 3, 4, 5 are used. The viewing screen 10 is tilted or tipped forwardly slightly, and located in a suitable housing, not shown. The mirrors 3, 4, 5 are located roughly parallel to the upper edge and the lower edge of the viewing screen, respectively. The path of the TV display from the projection screen 8 of the CRT 1 is through the optical enlarging lens system 2, then to the first mirror 3, to the second mirror 4, to the third mirror 5, and then to the back of the viewing screen 10. Of course, Fresnel lens can be placed in the path of the display and behind the viewing screen 10, as shown in connection with FIG. 1. The Fresnel lens 11 has been omitted from FIG. 3 for clarity of presentation. Additional distortion-free enlargement can thereby be obtained. The inclination of the viewing screen 10, as shown in FIG. 3, is a function of the positioning of the CRT relative to one of the reflecting mirror surfaces. If the CRT is removed closer to the first reflecting surface, the screen 10 surface area increases.

Figure 4:
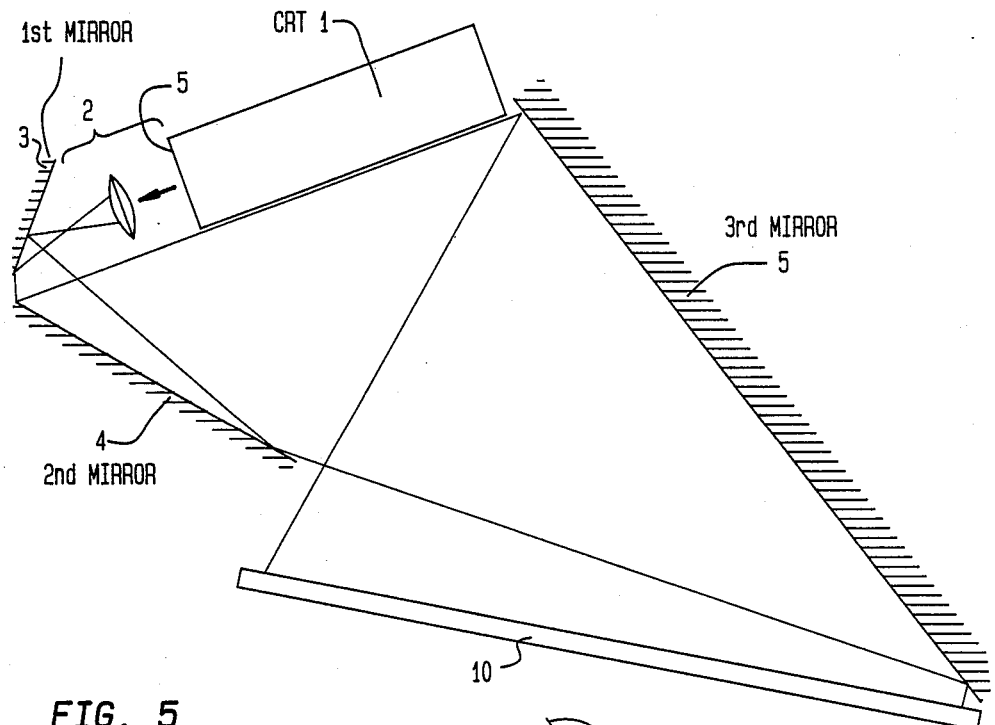
FIG. 4 is a schematic showing of the light path and placement of mirrors in a particularly compact arrangement.

FIG. 4 illustrates an arrangement in which the miniature CRT 1 is located adjacent the viewing screen 10, in such a manner that the TV display from the CRT screen 8 is enlarged through the optical lens system 2, deflected by a first mirror 3 to a second mirror 4 which, however, is located close to the first mirror 3 and approximately at right angles with respect thereto. The second mirror 4 then projects the TV display to a third mirror 5 which, in turn, projects the display on the viewing screen 10. The third mirror 5 is positioned approximately, but not quite parallel to the second mirror 4. This folding of the light path or light beam results in a particularly compact structural arrangement. The optical lens system 2 is so matched to the deflection mirrors 3, 4, 5 that projection of the TV display from screen 8 on the viewing screen 10 is obtained without distortion.

Figure 5:
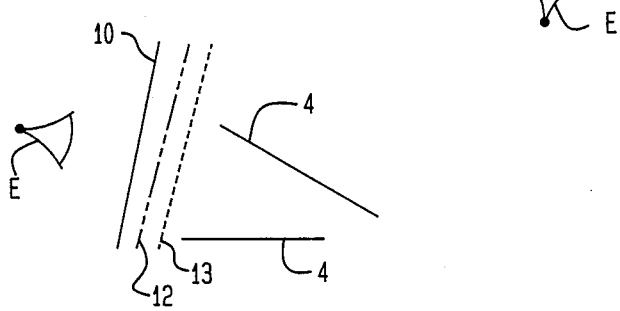
FIG. 5 is a part-exploded, highly schematic view of placement of filters with respect to a viewing screen.

Any one of the systems of FIGS. 1a, 1b, 2, 3, 4 may be used for B/W or color TV projection. For color TV the CRT 1 will, preferably, be a miniature color CRT and in such arrangements it is desirable to place a grey or neutral density filter in the path of the projected TV display. If the system is to be a black/white system, CRT 1 will be a B/W tube and, in such arrangements, the viewing screen 10 preferably has a color suppression filter 13 and/or a circular polarization filter 12 located in front of the viewing screen 10 in the path of the light beams L. The filters 12, 13 are shown, respectively in dashed and chain-dotted representation, for ease of visualization; the showing of FIG. 5 is highly schematic and partly exploded. For color TV displays, the color filter can be replaced merely by a grey filter to reduce stray light and reflection.

In accordance with a preferred feature of the invention, the CRT 1 is, preferably, a high-intensity CRT so that, even with substantial enlargement, with inherently multiple surface impingement, a contrast-rich and bright image will be obtained.

The light source providing the TV display need not be a CRT; rather than using a CRT, other light-emitting sources may be used, such as liquid crystal displays (LCDs), plasma displays, or vacuum-fluorescent apparatus, or electroluminescent displays (ELDs).

The arrangements of FIGS. 2 to 4 are shown with horizontal orientation. They may, of course, be placed in any direction, in space, for example rotated as schematically shown by the arrows A in connection with FIG. 1a, 1b. By arranging the light source 1 below the viewing screen 10, a particularly compact arrangement for vertical consoles apparatus is provided.

Various changes and modifications may be made, and features described in connection with any one of the embodiments may be used with any of the others, within the scope of the inventive concept.

All lens systems illustrated in FIGS. 1-4 are merely presented schematically.

We claim:

1. A projection television system having
    a miniature cathode ray tube (CRT), with a TV screen (8) to provide a TV display, and
    a viewing screen (10) for viewing a projected image of the TV display on the TV screen (8); said TV screen (8) being positioned laterally with respect to the viewing screen and at least approximately parallel to the central axis of the viewing screen (10);
    a plurality of mirrors (3, 4) in an optical path between the TV display on the TV screen and the viewing screen (10) for deflection of the display from the TV screen (8) toward the viewing screen (10), and
    an optical enlarging lens system (2), located in said optical path between the TV screen (8) and said mirrors (3, 4),
    wherein said optical enlarging lens system (2) is arranged to project the TV display from the TV screen (8) of the cathode ray tube (1) onto a first one of said first mirrors (3), and from the first mirror into a second mirror (4) located at least approximately parallel to said first mirror (3) and laterally offset with respect thereto, the display being then projected from said second mirror (4) onto the rear of said viewing screen (10).

2. A projection television system having
    a miniature cathode ray tube (CRT), with a TV screen (8) to provide a TV display, and
    a viewing screen (10) for viewing a projected image of the TV display on the TV screen (8), said TV screen (8) being positioned behind said viewing screen (10);
    a plurality of mirrors (3,4,5) in an optical path between the TV display on the TV screen (8) and the viewing screen (10) for deflection of the display from the TV screen (8) toward the viewing screen (10), and
    an optical enlarging lens system (2), located in said optical path between the TV screen (8) and said mirrors (3,4,5);
    said viewing screen (10) being forwardly tilted or tipped with respect to a viewer;
    and wherein the optical enlarging lens system (2) directs the TV display from the TV screen (8) of the CRT (1) onto a first deflection mirror (3), then onto a second deflection mirror (4), and then onto a third deflection mirror (5), said first, second and third deflection mirrors each being positioned approximately parallel to respective lines defined by upper and lower edges of the viewing screen (10) said mirrors, in combination with said lens system, forming an optically folded system.

3. A projection television system having
    a miniature cathode raty tube (CRT), with a TV screen (8) to provide a TV display, and
    a viewing screen (10), essentially vertically positioned, for viewing a projected image of the TV display on the TV screen (8), said TV screen (8) being located laterally behind said viewing screen (10);
    a plurality of deflection mirrors (3,4,5) in an optical path between the TV display on the TV screen (8) and the viewing screen (10) for deflection of the display from the TV screen (8) toward the viewing screen (10), and
    an optical enlarging lens system (2), located in said optical path between the TV screen (8) and said mirrors (3,4,5);
    wherein the optical lens system (2) directs the TV display from said TV screen (8) of the cathode ray tube in the direction of the viewing screen (10), the viewing screen (10), in combination with said lens system (2) and first, second, and third ones of said deflection mirrors (3,4,5) forming an optically folded system, said first, second and third deflection mirrors being located opposite each other for repeated deflection and progressive enlargement of said TV display.

4. An image projection system having
    an image generating means (1) having an image display surface (8);
    a viewing screen (10) for viewing the image displayed on said surface (8);
    said image generating means (1) being positioned behind said viewing screen (10);
    said viewing screen (10) being forwardly tilted or tipped with respect to a viewer;
    and a plurality of deflection mirrors (3, 4, 5) in an optical path between said display surface and the viewing screen (10) for deflection of the image on the display surface toward the viewing screen,
    and an optical lens system (2), located in said optical path between said surface and said mirrors,
    wherein the optical lens system (2) directs the display from the display surface (8) of the image generating means (1) successively onto a first deflection mirror (3), a second deflection mirror (4), and then onto a third deflection mirror (5), said first, second and third deflection mirror each being positioned approximately parallel to respective lines defined by upper and lower edges of the viewing screen (10) and, in combination with said lens system, forming an optical folded system.

5. An image projection system having an image generating means (1) having an image display surface (8);

a viewing screen (10), essentially vertically positioned, for viewing the image displayed on said surface (8);

said image generating means (1) being located laterally behind said viewing screen (10);

and a plurality of deflection mirrors (3, 4, 5) in an optical path between said display surface and the viewing screen (10) for deflection of the image on the display surface toward the viewing screen, and an optical lens system (2), located in said optical path between said surface and said mirrors, wherein the optical lens system (2) directs the display from the display surface (8) of the image generating means in the direction of the viewing screen (10), the viewing screen (10) in combination with said lens system (2) and a first, a second, and a third deflection mirror (3, 4, 5) forming an optically folded system.

* * * * *